(12) United States Patent
Lee et al.

(10) Patent No.: US 11,207,943 B2
(45) Date of Patent: Dec. 28, 2021

(54) METHOD OF DETERMINING CONDITION OF COOLANT IN VEHICLE

(71) Applicants: HYUNDAI MOTOR COMPANY, Seoul (KR); KIA MOTORS CORPORATION, Seoul (KR)

(72) Inventors: Jin Hun Lee, Yongin-si (KR); Young Pin Jin, Yongin-si (KR); Seung Yong Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 170 days.

(21) Appl. No.: 16/587,731

(22) Filed: Sep. 30, 2019

(65) Prior Publication Data

US 2020/0122543 A1 Apr. 23, 2020

(30) Foreign Application Priority Data

Oct. 22, 2018 (KR) .................. 10-2018-0125947

(51) Int. Cl.
*B60H 1/00* (2006.01)
*B60K 11/02* (2006.01)
*F01P 7/14* (2006.01)
*B60H 1/04* (2006.01)

(52) U.S. Cl.
CPC ............ *B60H 1/0073* (2019.05); *B60K 11/02* (2013.01); *B60H 1/04* (2013.01); *F01P 7/14* (2013.01)

(58) Field of Classification Search
CPC .. B60H 1/0073; B60H 1/04; B60H 11/00735; B60H 2001/00733; B60K 11/02; F01P 7/14
See application file for complete search history.

(56) References Cited

U.S. PATENT DOCUMENTS

2019/0186853 A1* 6/2019 Jin .................. G01M 13/00

FOREIGN PATENT DOCUMENTS

| EP | 2751861 B1 | 6/2015 |
|---|---|---|
| KR | 10-2013-0124789 A | 11/2013 |
| KR | 10-1567237 B1 | 11/2015 |
| KR | 10-1592789 B1 | 2/2016 |
| KR | 10-1704133 B1 | 2/2017 |

* cited by examiner

*Primary Examiner* — Jacob M Amick
(74) *Attorney, Agent, or Firm* — McDonnell Boehnen Hulbert & Berghoff LLP

(57) ABSTRACT

The present disclosure provides a method of determining a coolant condition of a vehicle, and more particularly, a method of accurately determining a coolant condition, e.g., a condition in which gas is present in a system and an insufficient coolant condition without a separate additional sensor in a vehicle using an electric water pump (EWP). To this end, the present disclosure provides a method of determining a coolant condition of a vehicle, including, in a vehicle including an electric water pump (EWP) for circulating a coolant, acquiring driving state information of a water pump while the water pump is driven, by a controller, calculating a ripple value of a driving state from the acquired driving state information of the water pump, by the controller, and comparing the calculated ripple value with a reference value to determine a condition of a coolant, by the controller.

15 Claims, 6 Drawing Sheets

[ NORMAL COOLANT CONDITION ]

[ INSUFFICIENT COOLANT CONDITION ]

METHOD OF DETERMINING CONDITION OF COOLANT IN VEHICLE

CROSS REFERENCE TO RELATED APPLICATION

This application is based on and claims priority under 35 U.S.C. § 119 to Korean Patent Application No. 10-2018-0125947 filed on Oct. 22, 2018, the entire contents of which are incorporated herein by reference.

BACKGROUND

(a) Technical Field

The present disclosure relates to a method of determining a coolant condition of a vehicle. More particularly, it relates to a method of accurately determining a coolant condition, e.g., a condition in which gas is present in a system and an insufficient coolant condition without a separate additional sensor in a vehicle using an electric water pump (EWP).

(b) Background Art

In the case of a general internal combustion engine (ICE) vehicle, to manage temperature of an engine at an appropriate level during driving, the vehicle includes a water cooling type cooling system that is installed therein and uses a coolant.

In general, an engine coolant is used as a medium (refrigerant) for cooling an engine in a water cooling type cooling system and is also used as a medium (heating medium) for transferring engine heat to heating air in a vehicle air conditioning system.

As such, a vehicle necessarily uses a coolant for management to manage temperature of an engine and for indoor heating of the vehicle, and in the vehicle, the coolant is transferred through a water pump and is circulated along a predetermined path between an engine and a heater core, and a radiator.

A general ICE vehicle has mainly used a mechanical water pump that receives power of an engine and is driven to be rotated, as a water pump, but recently, has also used an electric water pump (EWP) that is driven to be rotated by power of a motor.

For example, among eco-friendly vehicles, a pure electric vehicle (EV) or a fuel cell electric vehicle (FCEV) does not include an engine, and thus, is not capable of using power of the engine, and accordingly, it is required to use a EWP.

In addition, a hybrid electric vehicle (HEV) that uses both an engine and a motor as a driving source of a vehicle has also used a EWP.

An eco-friendly vehicle uses a coolant to cool an in-vehicle heating component, for example, a high-voltage electrical component of a motor, an inverter, or the like or to maintain a driving temperature of a fuel cell stack to an appropriate temperature and also uses a coolant for indoor heating of a vehicle along with an electric heater.

To this end, in an eco-friendly vehicle, a coolant is also circulated along a predetermined path between a radiator and a heating component such as a high-voltage electrical component or a fuel cell stack by a EWP that is driven to be rotated by power of a motor.

For example, a heat management system for managing driving temperature of a fuel cell stack in a fuel cell vehicle includes a radiator and a radiator fan for externally discharging heat of a coolant, a coolant line connected between the fuel cell stack and the radiator to circulate the coolant, a by-pass line and a 3-way valve for selectively bypassing the coolant not to be transmitted through the radiator, and an electric water pump (EWP) for pumping, transferring, and circulating the coolant.

In the heat management system, the water pump (EWP) is driven to externally discharge heat generated from the fuel cell stack through the radiator during power generation while circulating a coolant along a coolant line between the fuel cell stack and the radiator, and the 3-way valve.

During this procedure, an in-vehicle controller controls the water pump, the radiator fan, the 3-way valve, and so on to maintain a temperature of the fuel cell stack to a target temperature.

In addition to stack cooling, a heater is operated to heat a coolant introduced into the fuel cell stack to elevate a stack temperature.

The heat management system includes an apparatus for replenishing a coolant stored in a reservoir to a predetermined position such as a radiator through a replenishing line when the coolant dissipates in the coolant line.

When a coolant is insufficient in a vehicle or a large amount of gas is present in the coolant line, cooling performance is degraded, and thus, it is not possible to smoothly cool components or components as a cooling target is rapidly degraded, and seriously, the components may be damaged.

Among EWPs, in the case of a water pump (wet rotor type EWP) in which a coolant functions as a lubricant of a bearing, when the coolant is insufficient, the bearing may be damaged.

Accordingly, there is a need for a technology of accurately detecting and determining whether a coolant is insufficient, e.g., whether a large amount of gas is present in the coolant in a vehicle.

The cited references related thereto includes Korean Patent Publication No. 10-2013-0124789 (Nov. 15, 2013), Korean Patent No. 10-1567237 (Nov. 2, 2015), Korean Patent No. 10-1592789 (Feb. 1, 2016), and Korean Patent No. 10-1704133 (Feb. 1, 2017).

However, apparatuses and methods disclosed in the cited references have disadvantages in that they need a separate additional sensor for determining whether a coolant is insufficient.

In addition, in European Patent EP 2751861 B1 (Jun. 3, 2015) (hereinafter, referred to as 'Patent Document 1'), pump consumption power in a coolant normal state for each revolution per minute (RPM) is preset, and when consumption power in an actual pump driving state is different from the preset value corresponding the current pump RPM, a coolant is determined to be insufficient.

This is advantageous in that it is possible to detect a coolant insufficient condition without a separate additional sensor (instead, a sensor value in a pump is used), but is disadvantageous in that it is possible to detect the coolant insufficient condition only when the pump RPM is equal to or greater than predetermined speed and that it is not possible to detect a condition in which some gas is present, which is an operation prior to the coolant insufficient condition.

SUMMARY

In one aspect, the present disclosure provides a method of accurately determining a coolant condition without a separate additional sensor in a vehicle using an electric water pump (EWP).

In a preferred embodiment, a method of determining a coolant condition of a vehicle may include, in a vehicle, including an electric water pump (EWP) for circulating a coolant, acquiring driving state information of a water pump while the water pump is driven, by a controller, calculating a ripple value of a driving state from the acquired driving state information of the water pump, by the controller, and comparing the calculated ripple value with a reference value to determine a condition of a coolant, by the controller.

In another preferred embodiment, when the calculated ripple value is equal to or greater than the reference value, the controller may determine the condition of the coolant as an insufficient coolant condition.

In still another preferred embodiment, the controller is configured to control the water pump at constant speed while acquiring driving state information of the water pump and determines the reference value as a value corresponding to a speed command value while the water pump is controlled at constant speed.

In yet another preferred embodiment, the driving state information of the water pump may be consumption power or consumption current consumed while the water pump is driven, and the controller may calculate a difference value of maximum and minimum values of the consumption power or a difference value of maximum and minimum values of the consumption current, as the ripple value, and may compare the ripple value with a reference value.

In still yet another preferred embodiment, the driving state information of the water pump may be consumption power or consumption current consumed while the water pump is driven, and the controller may calculate an average value of the consumption power or an average value of the consumption current while the water pump is driven, may calculate a difference value between the calculated average value of the consumption power and current consumption power or a difference value between the calculated average value of the consumption current and current consumption current, as the ripple value, and may compare the ripple value with a reference value.

In a further preferred embodiment, the driving state information of the water pump may be speed of the water pump detected by a sensor, and the controller may be configured to calculate a difference value between the speed of the water pump detected by the sensor and a speed command value while the water pump is controlled at constant speed, as the ripple value, and to compare the ripple value with a reference value.

In another further preferred embodiment, the driving state information of the water pump may be speed of the water pump detected by a sensor, and the controller may be configured to take an average of the speed of the water pump while the water pump is driven, to obtain an average value, to calculate a difference value between the calculated average value and current water pump speed, as the ripple value, and compares the ripple value with a reference value.

In still another further preferred embodiment, the driving state information of the water pump may be a duty of a pulse width modulation (PWM) signal generated to drive and control a motor of the water pump, and the controller may be configured to calculate a difference value between maximum and minimum values of the PWM duty, as the ripple value, and to compare the ripple value with a reference value.

In yet another further preferred embodiment, the driving state information of the water pump is a duty of a pulse width modulation (PWM) signal generated to drive and control a motor of the water pump, and the controller may be configured to calculate an average value of PWM duties while the water pump is controlled, to calculate a difference value between the calculated average value of the PWM duties and a current PWM duty, as the ripple value, and to compare the ripple value with a reference value.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Hereinafter, exemplary embodiments of the present disclosure are described in detail so as for those of ordinary skill in the art to easily implement with reference to the accompanying drawings. However, the present disclosure is not limited to these embodiments and may be implemented in various different forms.

Throughout this specification, unless explicitly described to the contrary, the word "comprise" and variations such as "comprises" or "comprising," will be understood to imply the inclusion of stated elements but not the exclusion of any other elements.

First, to easily and clearly understand a difference between the problem of the prior art and the present disclosure, a conventional technology of detecting an insufficient coolant condition using consumption power of an electric water pump (EWP) is described.

The conventional technology for detecting the insufficient coolant condition using consumption power is disclosed in the Patent Document 1 above.

Figure 8:
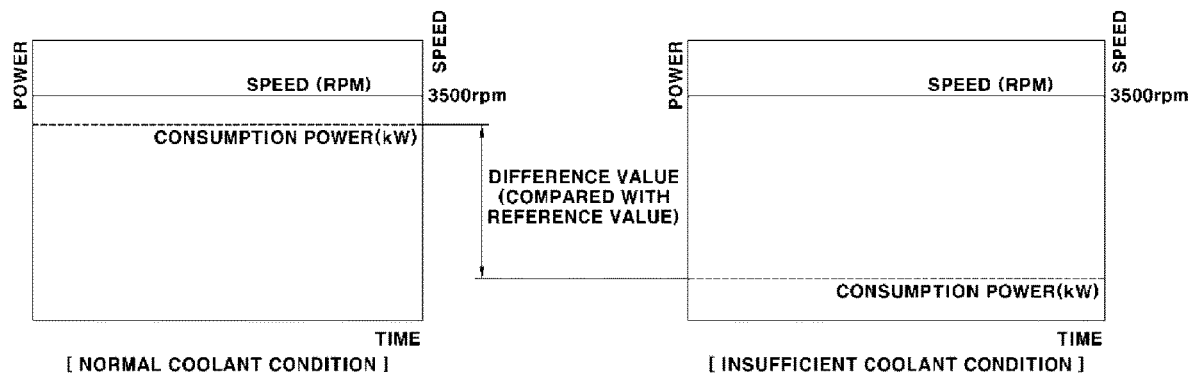
FIG. 8 is a diagram for explanation of a method of determining a coolant condition according to the prior art.

FIG. 8 is a diagram for explanation of a method of determining a coolant condition according to the prior art.

Figure 9:
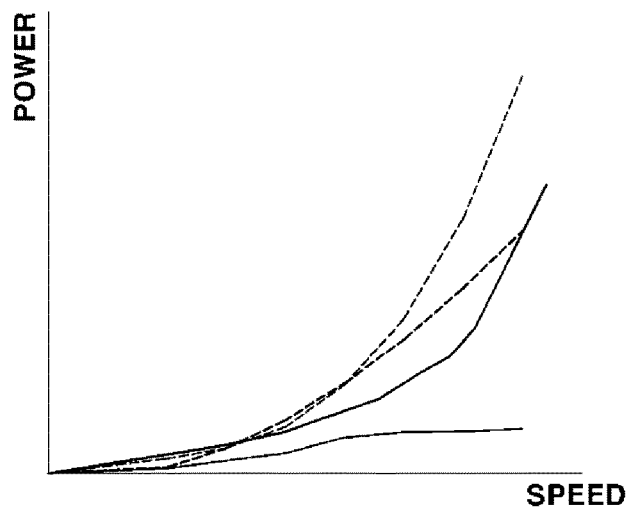
FIGS. 9, 10, and 11 are diagrams for explanation of a problem of the prior art and illustrates an example of consumption power (kW) for each revolution per minute (RPM) of a water pump depending on a coolant condition.
Figure 10:
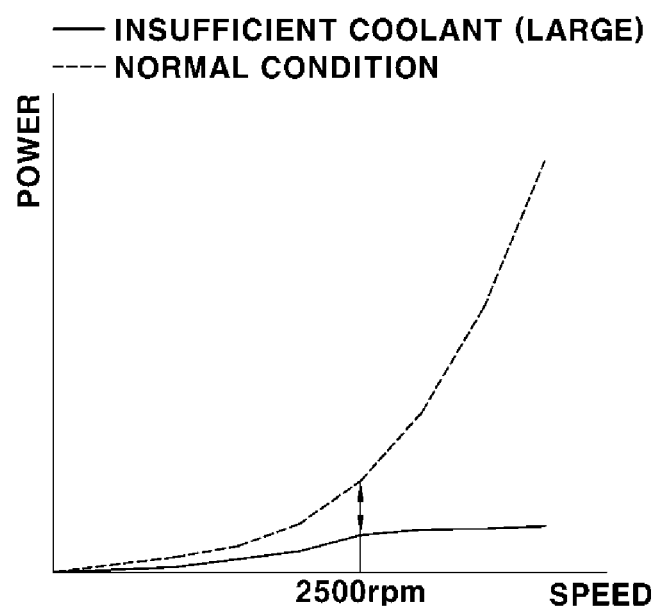
Figure 11:
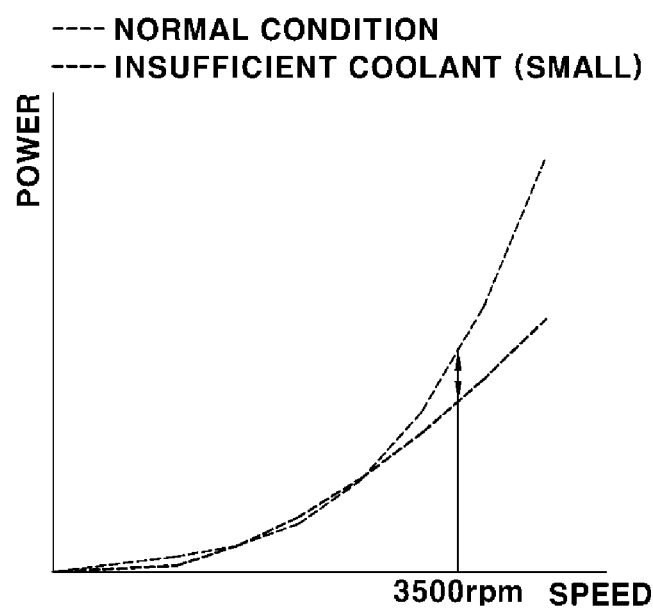

FIGS. 9 to 11 are diagrams for explanation of a problem of the prior art and illustrates an example of consumption power (kW) for each revolution per minute (RPM) of a water pump depending on a coolant condition.

FIG. 9 is a diagram in which a degree of an insufficient coolant condition is classified into being large, medium, and small and shows consumption power (kW) for each pump RPM in a normal coolant condition along with each insufficient coolant condition.

FIG. 10 is a diagram showing a comparison of consumption power (kW) for each pump RPM between a large degree of an insufficient coolant condition and a normal condition. FIG. 11 is a diagram showing a comparison of consumption power (kW) for each pump RPM between a small degree of an insufficient coolant condition and a normal condition.

Conventionally, consumption power (arison of consumption power (kW) for each pump RPM between a large degree of an insufficient coolant condition and a normal condition. FIG. 11 is a diagram showing a comparison of con) in an actual pump driving state is compared with a preset value ("consumption power setting value") corresponding to a current pump RPM and a difference therebetween is a very high value equal to or greater than a reference value, the coolant is determined to be insufficient.

Referring to FIG. 8, a consumption power setting value at pump speed (which is a speed command value) of 3500 RPM and a currently measured consumption power actual value may be compared to calculate a difference therebetween, and the difference value may be compared with a reference value at preset pump speed of 3500 RPM to determine a coolant condition.

In FIG. 8, a left part shows a normal coolant condition, and a right part shows an insufficient coolant condition. The left part shows that a difference between a consumption power setting value at pump speed of 3500 RPM and a measured consumption power actual value is less than a predetermined value, and the right part shows that the difference between the consumption power setting value at pump speed of 3500 RPM and the measured consumption power actual value is a large value that is equal to or greater than the reference value.

Consumption power for each speed in the normal coolant condition exemplified in FIGS. 9 to 11 may be predetermined as the setting value, and may be pre-input and stored for each speed in a controller and may be used to determine a coolant condition.

In addition, large, medium, and small degrees of insufficient coolant conditions shown in FIGS. 9 to 11 show an example of consumption power (kW) depending on a coolant condition in an actual pump driving state, that is, an example of a consumption power actual value.

Conventionally, a difference value between the consumption power setting value corresponding to a current pump RPM, that is, a preset consumption power value in a normal condition and a consumption power actual value at a current pump RPM as real-time information is calculated, and then, when the calculated difference value is equal to or greater than a reference value, a current coolant condition is determined to be an insufficient coolant condition, and here, the reference value is also a value that is preset for each speed to determine a coolant condition.

However, like in FIG. 10, when it is possible to detect an insufficient coolant condition from pump RPM of about 2500 RPM in a large degree of an insufficient coolant condition with a large shortage of a coolant, it may be possible to detect an insufficient coolant condition at about 3500 RPM in a small degree of an insufficient coolant condition like in FIG. 11.

As such, conventionally, a range in which an insufficient coolant condition is detectable is changed depending on a shortage of a coolant, and in particular, it is possible to detect the insufficient coolant condition only when pump RPM is equal to or greater than constant speed, and thus, it is difficult to detect the insufficient coolant condition at low pump RPM, and it is not possible to accurately detect the insufficient coolant condition unlike a condition in which some gas is present, which is an operation prior to the coolant insufficient condition.

When a vehicle is in a general driving state, in particular, when a vehicle is driven in a city section, an electric water pump (EWP) is mostly rotated at idle RPM, and thus, according to the prior art, it is not possible to detect an insufficient coolant condition, frequently.

As a result, as it is not possible to accurately detect a condition in which some gas is present in a coolant, an insufficient coolant condition, and so on, the coolant may not appropriately cool a component as a cooling target, or seriously, the component as a cooling target may be damaged and degraded.

Accordingly, the present disclosure is created to overcome the above problem and has a technological feature of determining whether a coolant is insufficient based on a variation on information obtained to determine a coolant condition.

Hereinafter, a method of determining a coolant condition according to an exemplary embodiment of the present disclosure is described in detail.

The present disclosure provides a method of accurately determining a coolant condition, for example, a condition in which gas is present in a coolant of a system and an insufficient coolant condition without a separate additional sensor in a vehicle using an electric water pump (EWP).

To this end, a cooling system (or a heat management system) according to the present disclosure may be configured in such a way that a controller collects and acquires, in real time, predetermined information required to determine a coolant condition, i.e., condition determination information, indicating a current coolant condition in the cooling system, and determines a coolant condition based on the variation (which is a ripple value of a water pump driving state value, to be described below) of the information that is acquired in real time by the controller.

Here, the coolant condition includes, in detail, a normal coolant condition in which an amount of a coolant is normally sufficient in an in-vehicle system in which a coolant is circulated, and an insufficient coolant condition in which an amount of a coolant is insufficient compared with a normal state, and such determination of a coolant condition refers to determination of whether an amount of a coolant in a current system is in a normal state or an insufficient state.

In addition, the coolant condition determination method according to the present disclosure may be applied to any vehicle using an electric water pump (EWP).

For example, the present disclosure may be applied to determine a condition of a coolant that is circulated by an electric water pump (EWP), cools a high-voltage electrical component such as a motor, an inverter, and a battery, or a device such as a fuel cell stack and an engine, and maintains and manages temperature thereof in an eco-friendly vehicle such as an electric vehicle (EV), a fuel cell vehicle (FCEV), or a hybrid electric vehicle (HEV).

In addition, in the case of a general internal combustion engine (ICE) vehicle, the present disclosure may be applied to determine a condition of a coolant that is circulated by a EWP as long as the vehicle uses a EWP that is not a mechanical water pump.

Here, the coolant is pumped by a EWP to be circulated in a path that is determined along a coolant line.

According to the present disclosure, the information required to determine and detect a coolant condition may be water pump driving state information, and in detail, may be at least one of consumption power or consumption current of a water pump, and a pulse width modulation (PWM) duty for driving and controlling a water pump (i.e., a pump motor), and revolution per minute (RPM) of a water pump.

Here, the consumption power of the water pump refers to consumption power (kW) of a motor of a water pump that is driven and controlled for coolant circulation, and the consumption current of the water pump refers to consumption current of a driven and controlled motor, that is, current supplied to a motor.

The PWM duty for driving and controlling the water pump refers to a duty of a PWM signal for driving an inverter, which is generated and applied to drive and control a motor of a water pump by a controller.

The RPM of the water pump refers to RPM of a motor, and hereinafter, is referred to as pump speed, and the pump speed refers to motor speed.

In a general vehicle cooling system or heat management system using a coolant, to drive and control a motor of an electric water pump (EWP), the water pump includes a current sensor 1 for detecting current applied to a motor, and a resolver 2 as a position sensor (i.e., a motor rotation angle sensor) for detecting an absolute angular position (θ) of a motor rotor.

As such, when a signal value of a conventional sensor such as the current sensor 1 and the resolver 2 which are preinstalled in a water pump is used, the consumption current and the motor speed (RPM) may be recognized.

According to the present disclosure, to determine a coolant condition in a cooling system or a heat management system, general sensor information that is acquired and collected in real time during driving of a water pump is used, and in this regard, information required to determine a coolant condition is acquired from a signal of the conventional sensor such as a current sensor or a resolver is required, and thus, it may not be required to additionally install and use a separate sensor or hardware.

Figure 1:
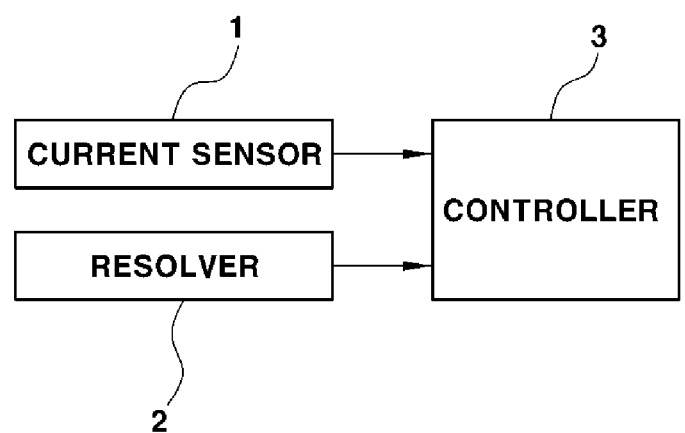
FIG. 1 is a block diagram showing the configuration of an apparatus for determining a coolant condition according to the present disclosure.

That is, according to the present disclosure, as shown in FIG. 1, a controller 3 may receive a signal of the current sensor 1 and a signal of the resolver 2, and in this regard, may acquire information on consumption current or consumption power of a water pump from a signal of the current sensor 1 in real time, and may also acquire information on pump speed (motor speed) from the signal of the resolver 2 in real time.

Although not illustrated in FIG. 1, the present disclosure may additionally use a voltage sensor for detecting a voltage applied to a pump motor in addition to a current sensor in such a way that the controller acquires consumption power information.

According to the present disclosure, acquisition of information on consumption power or power consumption and pump speed using a sensor signal by the controller as described above is not different from the conventional cooling system or heat management system of a vehicle and is well known to the one of ordinary skill in the art, and thus, a detailed description thereof is omitted in the present specification.

The PWM duty refers to a duty value of a PWM signal for an interval, which is generated to drive and control a motor of a water pump by the controller 3 and is motor control and driving state information (i.e., driving state information of a water pump) that is recognized by the controller during motor driving, and a detailed description of acquisition of the PWM duty by the controller is also omitted.

When consumption power or consumption current, speed (RPM), and a PWM duty of a water pump are in an insufficient coolant condition, according to the present disclosure, considering that those in the insufficient coolant condition are different from those in the normal coolant condition, a coolant condition may be set to be determined based on information on consumption power or consumption current, speed, and a PWM duty of a water pump, which is acquired in real time during pump driving by the controller 3.

Hereinafter, in a description of an exemplary embodiment of the present disclosure, the case in which consumption power is used is described, but according to the present disclosure, consumption current may be used instead of consumption power of a water pump, and accordingly, in the following description, consumption power may be replaced with consumption current.

Figure 2:
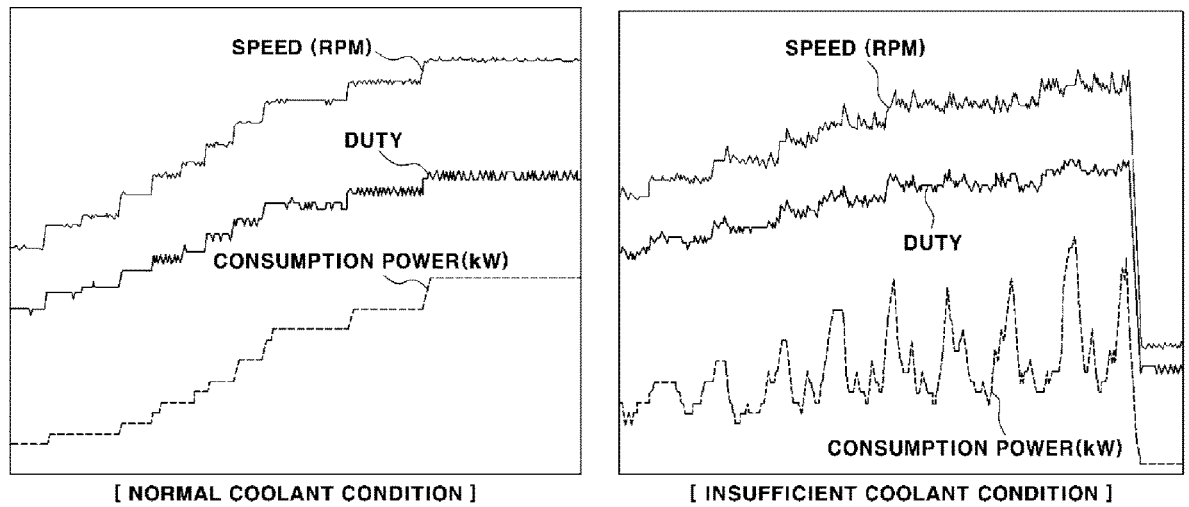
FIG. 2 is a diagram showing a comparison of consumption power, speed, and a pulse width modulation (PWM) duty, which are driving state information of a water pump in a normal coolant condition and an insufficient coolant condition.

FIG. 2 is a diagram showing a comparison of consumption power (kW), speed (RPM), and PWM duty, which are driving state information of a water pump in a normal coolant condition and an insufficient coolant condition, and as seen from FIG. 2, in a normal coolant condition, consumption power, speed, and a PWM duty are almost constant without generation of a ripple in each control state as long as they do not intentionally change a control state.

On the other hand, when a coolant of a cooling system or a heat management system of a vehicle is in an insufficient condition, that is, when a large amount of gas is present in a coolant line and a coolant is insufficient compared with a normal level, consumption power, speed, and a PWM duty have serious ripple compared with a normal condition.

Accordingly, it may be possible to determine a coolant condition using a ripple state of water pump driving state information that is acquired in real time.

FIGS. 3 to 7 are diagrams for explanation of a method of determining a coolant condition according to an exemplary embodiment of the present disclosure.

According to the present disclosure, a variation value of a water pump driving state, i.e., a ripple value of at least one of consumption power (or consumption current), speed, and a PWM duty of a water pump may be compared with a preset reference value, and a coolant condition may be determined according to the comparison result.

First, the controller may receive a signal of the resolver during driving of the water pump and may acquire current pump speed (RPM) that is real time feedback information on the water pump driving state from the received information of the resolver.

Then, the controller may compare a speed command value (RPM) as a speed control target value of the water pump with the acquired current pump speed (i.e., feedback pump speed detected by the resolver) to calculate a difference therebetween, and may compare a real time speed ripple value as the calculated difference value with a first speed ripple reference value corresponding to the current speed command value.

In this case, when the real time speed ripple value is equal to or greater than the first speed ripple reference value, a current coolant condition may be determined to be an insufficient coolant condition in which a large amount of gas is present at a predetermined level or greater in the coolant line.

As described above, the first speed ripple reference value may be a value based on a speed command value and may be set and stored by the controller through a map or the like, and upon acquiring a first speed ripple reference value corresponding to a current speed command value from the map or the like, the controller may compare the acquired first speed ripple reference value with the real time speed ripple value to determine a coolant condition.

Figure 3:
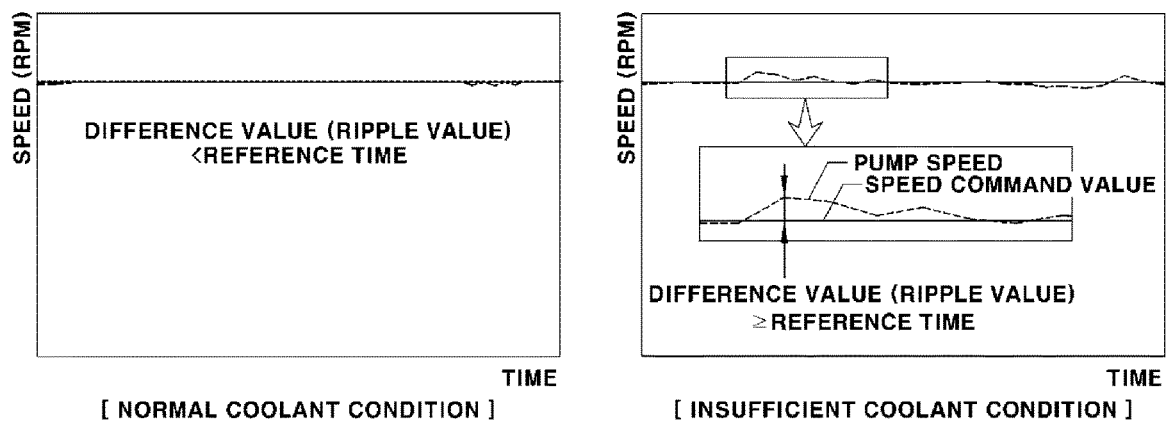
FIGS. 3, 4, 5, 6, and 7 are diagrams for explanation of a method of determining a coolant condition according to an exemplary embodiment of the present disclosure.

As seen from FIG. 3, in a normal condition, a difference value (i.e., a real time speed ripple value) between the speed command value and the measured feedback pump speed is negligible as a smaller level than a reference value (i.e., the first speed ripple reference value), and a small and constant difference value less than the speed ripple reference value is shown, for example, ripple is barely generated.

On the other hand, in an insufficient coolant condition, the difference value (i.e., the real time speed ripple value) between the speed command value and the measured feedback pump speed is equal to or greater than the reference value (i.e., the first speed ripple reference value).

Instead of the case in which the difference value between the speed command value and the feedback pump speed is calculated and used as a speed ripple value, as described above, an average value of feedback pump speed measured by the resolver 2 may be calculated in real time, a difference value between the average value of the pump speed calculated in real time and the measured feedback pump speed may be calculated as the real time speed ripple value, and the real time speed ripple value as the difference value from the average value may be compared with a preset second speed ripple reference value.

In this case, pump speed that is measured while the speed command value is maintained as a constant value (i.e., while a water pump is controlled at constant speed) may be compared with an average value that is calculated during the same time to calculate a difference value therebetween, the difference value may be determined as the real time speed ripple value, and then, the speed ripple value may be set to be compared with the second speed ripple reference value.

When the ripple value as the difference value between the average value and the measured value is equal to or greater than the second speed ripple reference value, a current coolant condition may be determined to be an insufficient coolant condition in which a large amount of gas is present at a predetermined level or greater in the coolant line.

As such, the case in which the speed ripple value as the difference value between the average value of the pump speed and the real time feedback pump speed is equal to or greater than the second speed ripple reference value may also refer to the case in which driving state ripple of the water pump is largely generated, which indicates a coolant condition in which a coolant is currently insufficient.

The controller may be configured to set both the first speed ripple reference value and the speed ripple reference value as a value based on the speed command value and to compare the first speed ripple reference value and the second speed ripple reference value, corresponding to a current speed command value while a water pump is controlled at constant speed, with the ripple value.

Then, the controller may acquire consumption power (or consumption current) of the water pump as real time pump driving state information from a signal of a current sensor while the water pump is driven and may calculate a ripple value of the consumption power, and then, may compare the calculated ripple value of the consumption power with a preset first power ripple reference value as a reference value.

Here, the consumption power of the water pump may be measured in a section in which the water pump is controlled at constant speed as pump speed, a difference value between maximum and minimum values of the consumption power while the water pump is controlled at constant speed may be calculated as a ripple value of the consumption power, and then, the calculated ripple value may be compared with the preset first power ripple reference value.

In this case, the calculated ripple value of the consumption power is equal to or greater than the first power ripple reference value, a current coolant condition may be determined to be an insufficient coolant condition in which a large amount of gas is present at a predetermined level or greater in the coolant line.

Instead of the case in which the difference value between the maximum and minimum values of the consumption power as the ripple value of the consumption power, as described above, while the water pump is controlled at constant speed as pump speed, the controller may measure the consumption power, and simultaneously, may calculate an average value of the measured consumption power, may calculate a difference value between a currently measured consumption power value of the average value of the consumption power that is calculated in real time as a real time ripple value of the consumption power, and may compare the real time consumption power ripple value as the different value with the average value with a preset second power ripple reference value.

In this case, the consumption power measured while pump speed is maintained as constant speed may be compared with the average value to calculate a difference value therebetween, the difference value may be compared with the second power ripple reference value, and when the difference value as the real time consumption power ripple value is equal to or greater than the second power ripple reference value, a current coolant condition may be determined to be an insufficient coolant condition in which a large amount of gas is present at a predetermined level or greater in the coolant line.

As such, the case in which the difference value between the average value of the consumption power and the measured consumption power is equal to or greater than the second power ripple reference value may also refer to the case in which ripple is largely generated and indicates that a current coolant condition is an insufficient condition.

The controller may be configured to set both the first power ripple reference value and the second power ripple reference value as a value based on the speed command value and to compare the first power ripple reference value and the second power ripple reference value, corresponding to a current speed command value while a water pump is controlled at constant speed, with the ripple value.

Figure 4:
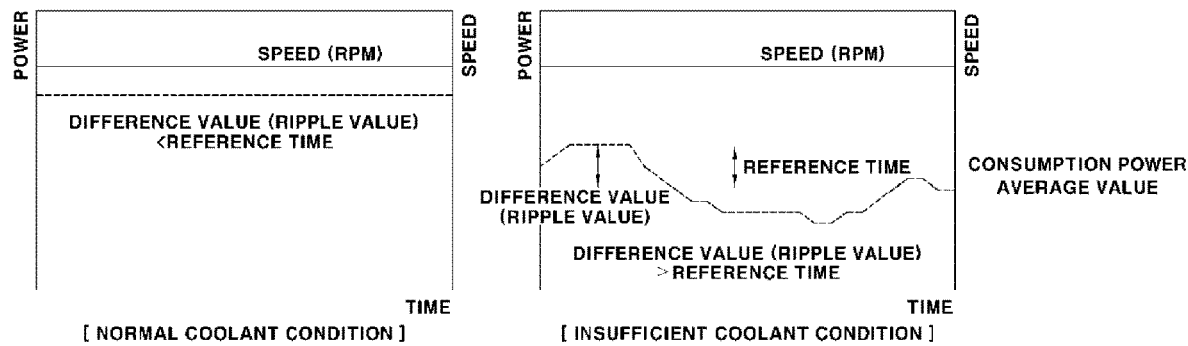

As seen from FIG. 4, while the water pump is controlled at constant speed, ripple of consumption power is barley generated in a normal coolant condition, but ripple of consumption power is largely generated in an insufficient coolant condition, and in particular, the ripple value as the difference value between consumption power values during a section in which pump speed is constant and an average value thereof is equal to or greater than the second power ripple reference value as the reference value.

Similarly, the controller may acquire a PWM duty value as a real time pump driving state information during driving of a water pump, that is, a duty value of a PWM signal generated to drive and control a motor of the water pump, may calculate a ripple value of the acquired PWM duty value in real time, and then, may compare the calculated ripple value of the PWM duty value with the preset first duty ripple reference value.

Here, like in the case in which the consumption power is used, the controller may measure the PWM duty in a section in which a water pump is controlled at constant speed as pump speed, may calculate a difference value between maximum and minimum values of the PWM duty while the water pump is controlled at constant speed as a ripple value of the PWM duty, and then, may compare the calculated ripple value of the PWM duty with the first duty ripple reference value.

In this case, when the calculated ripple value of the PWM duty is equal to or greater than the preset first duty ripple reference value, a current coolant condition is determined to be an insufficient coolant condition in which a large amount of gas is present at a predetermined level or greater in the coolant line.

Instead of the case in which the difference value between the maximum and minimum values of the PWM duty is calculated as a duty ripple value, as described above, while the water pump is controlled at constant speed as pump speed, the controller may acquire PWM duty information, and simultaneously, may calculate an average value of the acquired duty value, may calculate a difference value between a current duty value and the PWM duty average value that is calculated in real time, as a ripple value of the PWM duty, and may compare the calculated ripple value with the preset second duty ripple reference value.

In this case, a duty value measured while pump speed is maintained as constant speed may be compared with an average value, the difference value may be determined as a ripple value, and then, the ripple value may be set to be compared with the second duty ripple reference value.

When the ripple value as the difference value with the average is equal to or greater than the second duty ripple reference value, a current coolant condition may be determined to be an insufficient coolant condition in which a large amount of gas is present at a predetermined level or greater in the coolant line.

As such, the case in which the ripple value as the difference value between the duty average value and the measured duty value is equal to or greater than the second duty ripple reference value refers to the case in which ripple is largely generated and indicates that a current coolant condition is an insufficient condition.

The controller may be configured to set both the first duty ripple reference value and the second duty ripple reference value as a value based on the speed command value and to compare the first duty ripple reference value and the second duty ripple reference value, corresponding to a current speed command value while a water pump is controlled at constant speed, with the ripple value.

Figure 5:
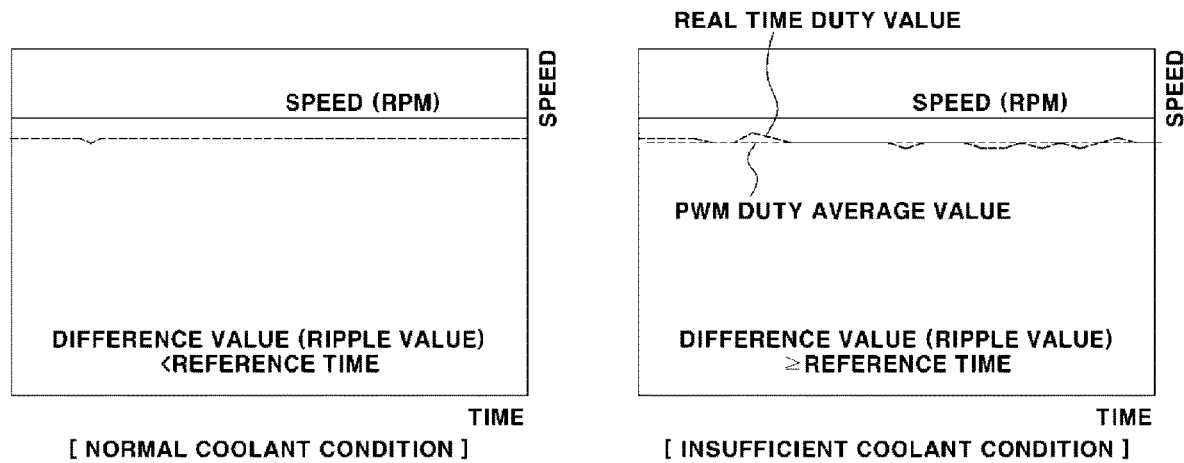

As seen from FIG. 5, while the water pump is controlled at constant speed, ripple of consumption power is not largely generated in a normal coolant condition, but ripple of the PWM duty is largely generated in an insufficient coolant condition, in more detail, the ripple value as the difference value between the duty average value and the real time duty value is largely generated during a section in which pump speed is constant in an insufficient coolant condition.

The controller may be configured to perform frequency spectrum conversion on a pump speed that is measured by a sensor while the water pump is controlled at constant speed, consumption power (or consumption current) that is measured in real time, or a value of a PWM duty, and then, to calculate the sum of harmonic frequency values as a ripple value, and when the sum of the harmonic frequency values is equal to or greater than a harmonic frequency reference value corresponding to a current speed command value, the controller may be configured to determine a current coolant condition as an insufficient coolant condition in which a large amount of gas is present at a predetermined level or greater in the coolant line.

Here, the controller may be configured to use only one of pump speed, consumption power, and a PWM duty, but may be configured to use two or more thereof, and in this case, needless to say, a harmonic frequency reference value of the pump speed, the consumption power, and the PWM duty needs to be separately set.

When the two or more thereof are used, when any one of the sums of harmonic frequency values obtained after frequency spectrum conversion is performed is equal to or greater than the corresponding harmonic frequency reference value, a current coolant condition may be determined as an insufficient coolant condition.

As described above, the sum of the harmonic frequency values obtained after frequency spectrum conversion is performed on the pump speed, the consumption power, and the PWM duty value also represents a ripple value as a variation of a water pump driving state value, and thus, the present embodiment in which the harmonic frequency value is used may also use a ripple value of the water pump driving state information.

The controller may be configured to perform frequency spectrum conversion on a pump speed that is measured by a sensor while the water pump is controlled at constant speed, consumption power (or consumption current) that is measured in real time, or a value of a PWM duty, and then, to calculate a value of a fundamental wave component as a ripple value, and when the value of the fundamental wave component is equal to or less than a fundamental wave reference value corresponding to a current speed command value, the controller may be configured to determine a current coolant condition as an insufficient coolant condition in which a large amount of gas is present at a predetermined level or greater in the coolant line.

Here, the controller may be configured to use only one of pump speed, consumption power, and a PWM duty, but may be configured to use two or more thereof, and in this case, needless to say, a fundamental wave reference value of the pump speed, the consumption power, and the PWM duty needs to be separately set.

When the two or more thereof are used, when any one of the fundamental wave values (i.e., values of fundamental wave components) obtained after frequency spectrum conversion is equal to or greater than the corresponding fundamental wave reference value, a current coolant condition may be determined as an insufficient coolant condition.

As described above, the fundamental wave value obtained after frequency spectrum conversion is performed on the pump speed, the consumption power, and the PWM duty value also represents a ripple value as a variation of a water pump driving state value, and thus, the present embodiment in which the fundamental wave value is used may also use a ripple value of the water pump driving state information.

Figure 6:
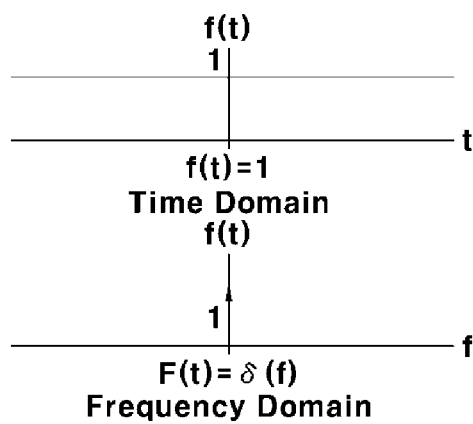

FIG. 6 is a diagram showing a fundamental wave component with a direct current (DC) waveform, and as shown in the drawing, in the case of a DC waveform, when frequency conversion is performed to frequency domain from time domain, only a frequency corresponding to a fundamental wave (0 Hz) may be formed, as shown in FIG. 6.

Figure 7:
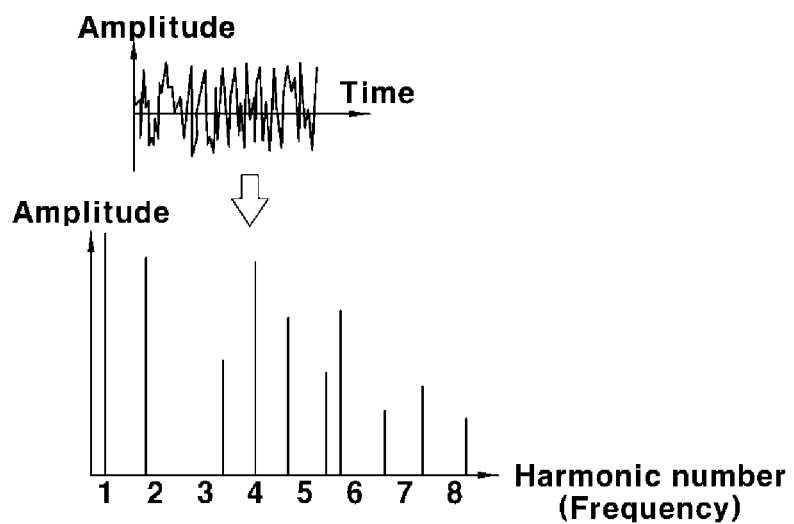

As shown in FIG. 7, when ripple is generated in a DC waveform, when frequency conversion is performed on the waveform, the waveform is configured with a fundamental wave and a harmonic frequency, and in this case, when a value of the fundamental wave is equal to or less than a reference value or the sum of harmonic frequency values is equal to or greater than a reference value, a current coolant condition may be determined to be an insufficient coolant condition in which gas is present in a coolant.

Accordingly, according to the method of determining a coolant condition of a vehicle according to an exemplary embodiment of the present disclosure, an insufficient coolant condition may be accurately detected using a conventional sensor without addition of a separate sensor or hardware.

According to the present disclosure, an insufficient coolant condition may be early detected from a time point in which a coolant becomes insufficient, that is, a time point in which gas is present in a coolant line, and when a coolant is replenished due to repairs or the like, it may be possible to accurately determine whether gas is present in the coolant line.

Accordingly, according to the method of determining a coolant condition of a vehicle according to the present disclosure, whether gas is present in a system and an insufficient coolant condition in a vehicle may be accurately detected without a separate sensor and the insufficient coolant condition may be accurately detected, and accordingly, needless to say, components as a cooling target may be prevented from being damaged and degraded, and durability lifetime of a water pump may be prevented from being shortened.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

The invention claimed is:

1. A method of determining a coolant condition of a vehicle, the method comprising:
   in a vehicle, including an electric water pump (EWP) for circulating a coolant,
   acquiring driving state information of a water pump while the water pump is driven, by a controller;
   wherein the controller controls the water pump at constant speed while acquiring driving state information of the water pump and determines the reference value as a value corresponding to a speed command value while the water pump is controlled at constant speed;
   calculating a ripple value of a driving state from the acquired driving state information of the water pump, by the controller; and
   comparing the calculated ripple value with a reference value to determine a condition of a coolant, by the controller.

2. The method of claim 1, wherein, when the calculated ripple value is equal to or greater than the reference value, the controller determines the condition of the coolant as an insufficient coolant condition among a normal coolant condition and the insufficient coolant condition.

3. The method of claim 2, wherein the controller controls the water pump at constant speed while acquiring driving state information of the water pump and determines the reference value as a value corresponding to a speed command value while the water pump is controlled at constant speed.

4. The method of claim 1, wherein:
   the driving state information of the water pump is consumption power or consumption current consumed while the water pump is driven; and
   the controller calculates a difference value of maximum and minimum values of the consumption power or a difference value of maximum and minimum values of the consumption current, as the ripple value, and compares the ripple value with a reference value.

5. The method of claim 1, wherein:
   the driving state information of the water pump is consumption power or consumption current consumed while the water pump is driven; and
   the controller calculates an average value of the consumption power or an average value of the consumption current while the water pump is driven, calculates a difference value between the calculated average value of the consumption power and current consumption power or a difference value between the calculated average value of the consumption current and current consumption current, as the ripple value, and compares the ripple value with a reference value.

6. The method of claim 1, wherein:
   the driving state information of the water pump is speed of the water pump detected by a sensor; and
   the controller calculates a difference value between the speed of the water pump detected by the sensor and a speed command value while the water pump is controlled at constant speed, as the ripple value, and compares the ripple value with a reference value.

7. The method of claim 1, wherein:
   the driving state information of the water pump is speed of the water pump detected by a sensor; and
   the controller takes an average of the speed of the water pump while the water pump is driven, to obtain an average value, calculates a difference value between the calculated average value and current water pump speed, as the ripple value, and compares the ripple value with a reference value.

8. The method of claim 1, wherein:
   the driving state information of the water pump is a duty of a pulse width modulation (PWM) signal generated to drive and control a motor of the water pump; and
   the controller calculates a difference value between maximum and minimum values of the PWM duty, as the ripple value, and compares the ripple value with a reference value.

9. The method of claim 1, wherein:
   the driving state information of the water pump is a duty of a pulse width modulation (PWM) signal generated to drive and control a motor of the water pump; and
   the controller calculates an average value of PWM duties while the water pump is controlled, calculates a difference value between the calculated average value of the PWM duties and a current PWM duty, as the ripple value, and compares the ripple value with a reference value.

10. The method of claim 1, wherein:
    the driving state information of the water pump is consumption power or consumption current consumed while the water pump is driven; and
    the controller performs frequency spectrum conversion on a value of the consumption power or a value of the consumption current to calculate the sum of harmonic frequency values, as the ripple value, and compares the sum of the harmonic frequency values with a reference value.

11. The method of claim 1, wherein:
    the driving state information of the water pump is consumption power or consumption current consumed while the water pump is driven; and
    the controller performs frequency spectrum conversion on a value of the consumption power or a value of the consumption current to calculate a value of a fundamental wave component, as the ripple value, and compares the value of the fundamental wave component with a reference value.

12. The method of claim 1, wherein:
the driving state information of the water pump is speed of the water pump detected by a sensor; and
the controller performs frequency spectrum conversion on a speed value of the water pump to calculate the sum of harmonic frequency values, as the ripple value, and compares the sum of the harmonic frequency values with a reference value.

13. The method of claim 1, the driving state information of the water pump is speed of the water pump detected by a sensor; and
the controller performs frequency spectrum conversion on a speed value of the water pump to calculate a value of a fundamental wave component, as the ripple value, and compares the value of the fundamental wave component with a reference value.

14. The method of claim 1, wherein:
the driving state information of the water pump is a duty of a pulse width modulation (PWM) signal generated to drive and control a motor of the water pump; and
the controller performs frequency spectrum conversion on a value of the PWM duty to calculate the sum of harmonic frequency values, as the ripple value, and compares the sum of the harmonic frequency values with a reference value.

15. The method of claim 1, wherein:
the driving state information of the water pump is a duty of a pulse width modulation (PWM) signal generated to drive and control a motor of the water pump; and
the controller performs frequency spectrum conversion on a value of the PWM duty to calculate a value of a fundamental wave component, as the ripple value, and compares the value of the fundamental wave component with a reference value.

* * * * *